(12) United States Patent
Khan et al.

(10) Patent No.: US 12,597,860 B2
(45) Date of Patent: Apr. 7, 2026

(54) INVERTING SINGLE-INDUCTOR MULTIPLE-OUTPUT (SIMO) DC-DC CONVERTERS

(71) Applicants: Iowa State University Research Foundation, Inc., Ames, IA (US); International Business Machines Corporation, Armonk, NY (US)

(72) Inventors: Muhammad Rizwan Khan, Ames, IA (US); Cheng Huang, Ames, IA (US); Xin Zhang, Chappaqua, NY (US)

(73) Assignees: Iowa State University Research Foundation, Inc., Ames, IA (US); International Business Machines Corporation, Armonk, NY (US)

( * ) Notice: Subject to any disclaimer, the term of this patent is extended or adjusted under 35 U.S.C. 154(b) by 307 days.

(21) Appl. No.: 18/489,905

(22) Filed: Oct. 19, 2023

(65) Prior Publication Data

US 2025/0132674 A1 Apr. 24, 2025

(51) Int. Cl.
　　*H02M 3/158* (2006.01)
　　*H02M 1/00* (2007.01)

(52) U.S. Cl.
　　CPC ........... *H02M 3/158* (2013.01); *H02M 1/009* (2021.05)

(58) Field of Classification Search
　　CPC ............................. H02M 3/158; H02M 1/009
　　See application file for complete search history.

(56) References Cited

U.S. PATENT DOCUMENTS

| | | | |
|---|---|---|---|
| 8,624,429 B2 | 1/2014 | Jing et al. | |
| 9,099,919 B2 * | 8/2015 | Jing ...................... | H02M 3/158 |
| 10,291,126 B1 * | 5/2019 | Wei ........................ | H02M 3/158 |
| 2005/0264271 A1 * | 12/2005 | Lam ........................ | H02M 1/10 |
| | | | 323/282 |

(Continued)

OTHER PUBLICATIONS

Fan, S. et al., "From Specification to Topology: Automatic Power Converter Design via Reinforcement Learning," 2021 IEEE/ACM International Conference On Computer Aided Design (ICCAD), Nov. 1-4, 2021, Munich, Germany, IEEE, 9 pages.

Jung, M.-Y. et al., "An Error-Based Controlled Single-Inductor 10-Output DC-DC Buck Converter With High Efficiency Under Light Load Using Adaptive Pulse Modulation," IEEE Journal of Solid-State Circuits, vol. 50, Issue 12, Dec. 2015, first published Sep. 2015, IEEE, pp. 2825-2838.

(Continued)

*Primary Examiner* — Sisay G Tiku

(74) *Attorney, Agent, or Firm* — Withrow & Terranova, PLLC

(57) ABSTRACT

A power converter is disclosed having an input switch coupled between a supply terminal and a switching input node, a capacitor coupled between the switching input node and a switching multiple output node, a discharge switch coupled between the switching input node and ground, an inductor coupled between the switching multiple output node and ground, a plurality of output switches coupled between the switching multiple output node and a corresponding one of a plurality of output terminals. A converter controller has a plurality of switch control outputs coupled to corresponding ones of an input switching control terminal, a discharge switching control terminal, and an output switching control terminal of each of the plurality of output switches. The converter controller generates switching signals for the input switch, the discharge switch, and the plurality of output switches to generate individual output voltages at corresponding ones of the plurality of output terminals.

20 Claims, 8 Drawing Sheets

(56)           References Cited

U.S. PATENT DOCUMENTS

| | | | | |
|---|---|---|---|---|
| 2010/0283322 | A1* | 11/2010 | Wibben | H02M 3/158 |
| | | | | 307/31 |
| 2012/0326691 | A1* | 12/2012 | Kuan | H02M 3/158 |
| | | | | 323/299 |
| 2014/0232189 | A1* | 8/2014 | Gasparini | H02M 3/158 |
| | | | | 307/31 |
| 2017/0194857 | A1* | 7/2017 | Hang | H02M 3/02 |
| 2018/0092179 | A1* | 3/2018 | Guo | H02M 1/14 |
| 2020/0212801 | A1* | 7/2020 | Cavallini | H02M 3/158 |
| 2021/0152082 | A1* | 5/2021 | Ozanoglu | H02M 1/0009 |
| 2023/0216409 | A1* | 7/2023 | Ravi | H02M 3/07 |
| | | | | 323/282 |
| 2024/0333155 | A1* | 10/2024 | Yang | H02M 3/1582 |
| 2025/0047200 | A1* | 2/2025 | Hukel | H02M 3/07 |

OTHER PUBLICATIONS

Le, H.-P. et al., "A Single-Inductor Switching DC-DC Converter With Five Outputs and Ordered Power-Distributive Control," IEEE Journal of Solid-State Circuits, vol. 42, Issue 12, Dec. 2007, first published Nov. 2007, IEEE, pp. 2706-2714.

Ma, D. et al., "A pseudo-CCM/DCM SIMO switching converter with freewheel switching," IEEE Journal of Solid-State Circuits, vol. 38, No. 6, Jun. 2003, IEEE, pp. 1007-1014.

Maxim Integrated, "MAX77650/MAX77651 Ultra-Low Power PMIC with 3-Output SIMO and Power Path Charger for Small Li+," Product Datasheet, 19-8550, Rev 7, Sep. 2018, available from the Internet: [URL: https://www.maximintegrated.com/en/products/power/power-management-ics/MAX77650.html], 82 pages.

Texas Instruments, "TPS63710 Low Noise Synchronous Inverting Buck Converter," SLVSD44A, Sep. 2017, Revised Jul. 2018, 36 pages.

* cited by examiner

FIG. 7

INVERTING SINGLE-INDUCTOR MULTIPLE-OUTPUT (SIMO) DC-DC CONVERTERS

FIELD OF THE DISCLOSURE

The present disclosure generally relates to a system and method for providing electrical power conversion, and more specifically to a system and method for providing electrical power conversion of direct current power sources providing multiple reversed-polarity direct current voltage rails (inverting) using a single power inductor, with increased energy efficiency from a reduced size power converter.

BACKGROUND

Inverting direct current-to-direct current converters serve as a crucial component in a broad range of applications, including power supplies for analog-to-digital converter/digital-to-analog systems in telecommunications, biasing circuits for gallium nitride transistors, optical module laser diode drivers, and mini-light-emitting diode controllers, among others. Amid increasing demands for energy efficiency and miniaturization, there is a pressing need for power converters that not only minimize switching and conduction power losses but also occupy less physical space on an integrated circuit. Such improvements would enhance overall system efficiency and power density while simultaneously lowering costs.

SUMMARY

A power converter is disclosed having an input switch coupled between a supply terminal and a switching input node, a capacitor coupled between the switching input node and a switching multiple output node, a discharge switch coupled between the switching input node and a fixed voltage node, an inductor coupled between the switching multiple output node and the fixed voltage node, a plurality of output switches coupled between the switching multiple output node and a corresponding one of a plurality of output terminals. In exemplary embodiments the fixed voltage node is ground.

The power converter includes a converter controller that has a plurality of switch control signal outputs coupled to corresponding ones of an input switching control terminal, a discharge switching control terminal, and an output switching control terminal of the driver of each of the plurality of output switches. The converter controller is configured to generate switching signals for the input switch, the discharge switch, and the plurality of output switches to generate individual output voltages at corresponding ones of the plurality of output terminals. As such, the converter provides multiple regulated reversed-polarity direct current output voltage rails using only one power inductor.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

FIG. 7 is a timing diagram of control signals and resultant signals under time multiplexing control for the power converter and converter controller depicted in FIG. 3 and FIG. 4, respectively.

DETAILED DESCRIPTION

Figure 1:
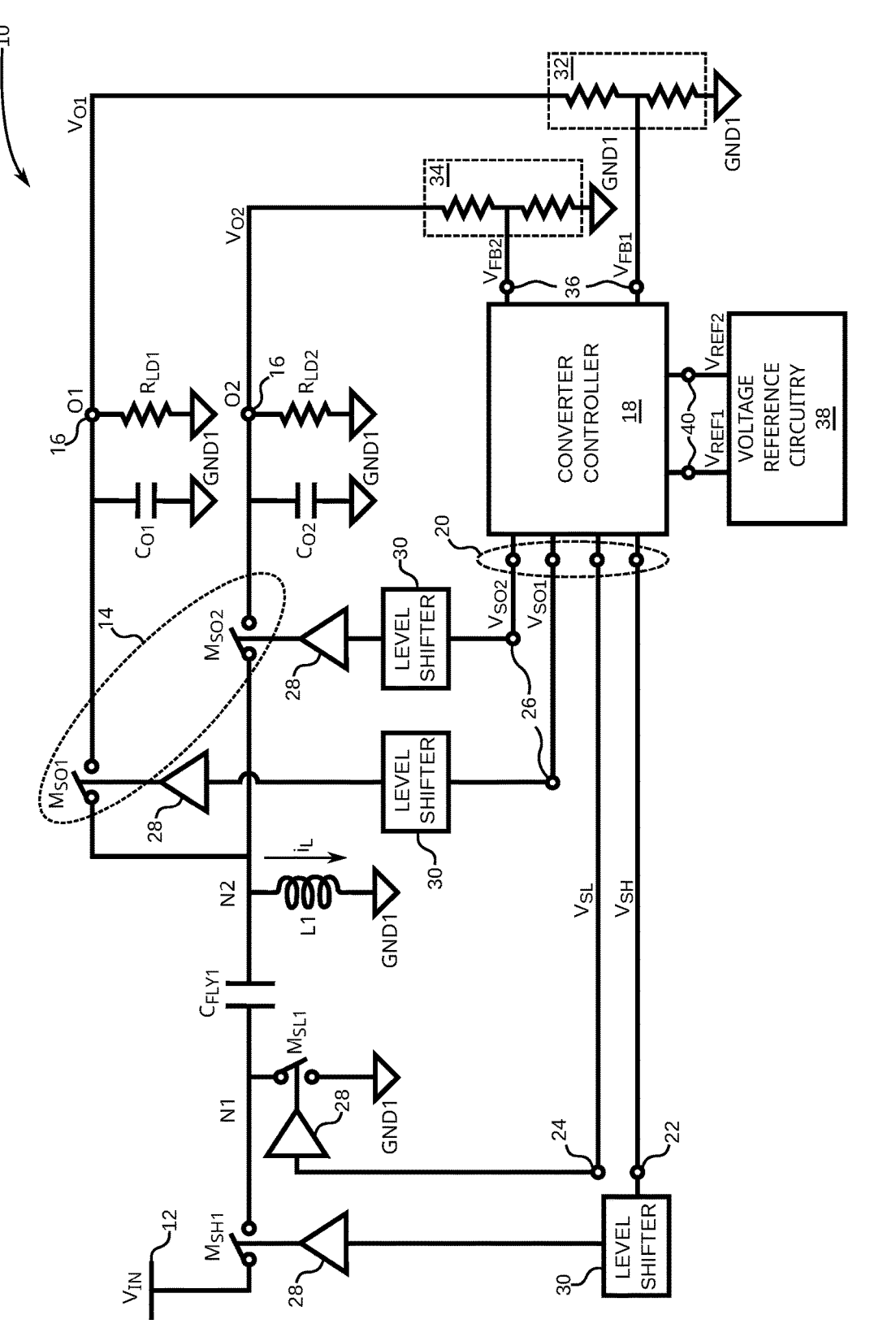
FIG. 1 is a diagram depicting an exemplary embodiment of a dual output version of a power converter that is in accordance with the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

FIG. 1 is a system diagram of a power converter 10 that is structured in accordance with the present disclosure. The power converter 10 has an input switch $M_{SH1}$ coupled between a supply terminal 12 and a switching input node N1. The supply terminal 12 is configured to receive a supply voltage $V_{IN}$. A switching capacitor $C_{FLY1}$ is coupled between the switching input node N1 and a switching multiple-output node N2. A discharge switch $M_{SL1}$ is coupled between the switching input node N1 and a fixed voltage node GND1. In this exemplary embodiment, the fixed voltage node is ground. An inductor L1 is coupled between the switching multiple output node N2 and the fixed voltage node GND1. A plurality of output switches 14 is coupled between the switching multiple output node N2 and a corresponding one of a plurality of output terminals 16. In this exemplary embodiment, a first one of the plurality of output switches 14 labeled $M_{SO1}$ is coupled between the switching multiple output node N2 and a first one of the plurality of output terminals 16 that is labeled O1. A first output capacitor $C_{O1}$ is coupled between the first one of the plurality of output terminals 16 that is labeled O1 and the fixed voltage node GND1. A first load resistor $R_{LD1}$ is coupled in parallel with the first output capacitor $C_{O1}$. A second one of the plurality of the output switches 16 labeled $M_{SO2}$ is coupled between the switching multiple output node N2 and a second one of the plurality of output terminals 16 that is labeled O2. A second output capacitor $C_{O2}$ is coupled between the second one of the plurality of output terminals 16 that is labeled O2 and the fixed voltage node GND1. A second load resistor $R_{LD2}$ is coupled in parallel with the second output capacitor $C_{O2}$. It is to be understood that the first load resistor $R_{DL1}$ and the second load resistor $R_{DL2}$ represent loads that can be but are not limited to analog integrated circuits, digital integrated circuits, and discrete resistive, inductive, and capacitive circuit elements and combinations thereof.

A converter controller 18 has a plurality of switch control output terminals 20 coupled to corresponding ones of an input switching control terminal 22, a discharge switching control terminal 24, and an output switching control terminal 26 of each of the plurality of output switches 14, wherein the converter controller 18 is configured to generate switching signals for the input switch $M_{SH1}$, the discharge switch $M_{SL1}$, and the plurality of output switches 14 to generate individual output voltages $V_{O1}$ and $V_{O2}$ at corresponding ones of the plurality of output terminals 16. In the exemplary embodiment of FIG. 1, each of the input switch $M_{SH1}$, the discharge switch $M_{SL1}$, and the plurality of output switches 14 are driven to a closed state that is low impedance or an open state by drivers 28. Moreover, level shifters 30 may be employed to level shift the switch control signals $V_{SH}$, $V_{SO1}$, and $V_{SO2}$, if necessary. The switch control signal $V_{SL}$ is depicted as not needing to be level shifted.

The first output voltage $V_{O1}$ and the second output voltage $V_{O2}$ are each divided by a first resistor ladder 32 and a second resistor ladder 34, respectively, with a ratio to provide the converter controller 18 with a first feedback voltage $V_{FB1}$ and a second feedback voltage $V_{FB2}$, respectively. The converter controller 18 includes feedback input terminals 36 that are configured to receive the first feedback voltage $V_{FB1}$ and the second feedback voltage $V_{FB2}$, respectively. Reference voltage circuitry 38 generates a first reference voltage $V_{REF1}$ and a second reference voltage $V_{REF2}$. The converter controller 18 further includes reference input terminals 40 that are configured to receive the first reference voltage $V_{REF1}$ and the second reference voltage $V_{REF2}$.

Figure 2:
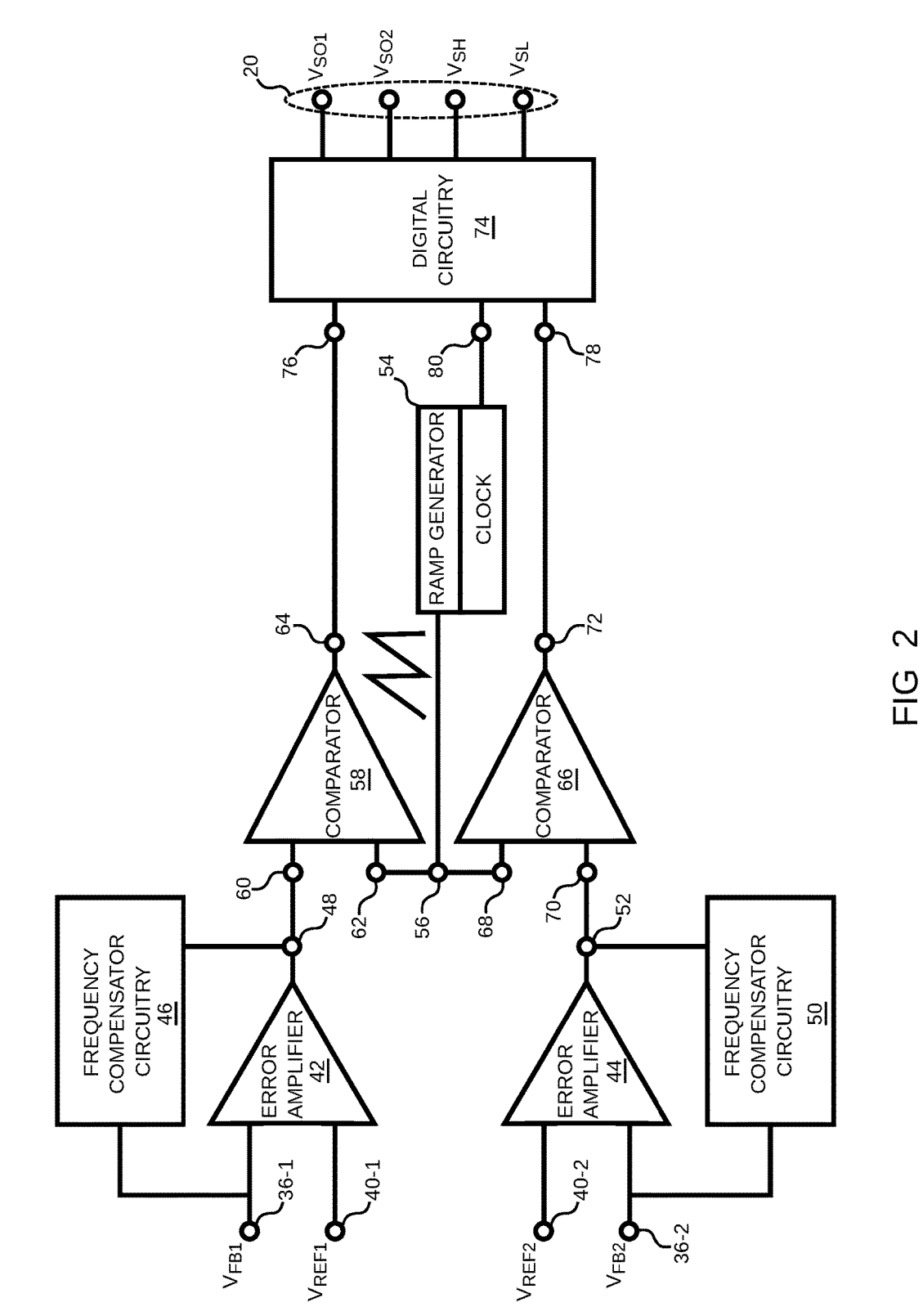
FIG. 2 is a diagram of a converter controller included in the power converter depicted in FIG. 1.

In this regard, FIG. 2 is a more detailed diagram of the converter controller 18 that is configured to compare the first feedback voltage $V_{FB1}$ with the first reference voltage $V_{REF1}$ and compare the second feedback voltage $V_{FB2}$ with the second reference voltage $V_{REF2}$. The converter controller 18 includes a first error amplifier 42 and a second error amplifier 44 that are configured to receive the first feedback voltage $V_{FB1}$ by way of a first feedback input terminal 36-1 and the second voltage $V_{FB2}$ by way of a second feedback input terminal 36-2. The first error amplifier 42 and the second error amplifier 44 are further configured to receive the first reference voltage $V_{REF1}$ by way of a first reference input terminal 40-1 and the second reference voltage $V_{REF2}$ by way of a second reference input terminal 40-2.

Source-follower circuits (not shown) are configured to level-shift the negative feedback voltages to within the input swing of the first error amplifier 42 and the second error amplifier 44. In some embodiments, the source-follower circuits are internally integrated with the first error amplifier 42 and the second error amplifier 44, respectively.

A first frequency compensator circuitry 46 is coupled across the first error amplifier 42 between the first feedback input terminal 36-1 and a first error output terminal 48, and a second frequency compensator circuitry 50 is coupled across the second error amplifier 44 between the second feedback input terminal 36-2 and a second error output terminal 52 to ensure system stability. In some embodiments, the first frequency compensator circuitry 46 and the second frequency compensator circuitry 50 are resistor-capacitor filters. Pulse-width modulation signals are generated as outputs of the first error amplifier 42 and the second error amplifier 44 cross the ramp signal. The duty cycles of the pulse-width modulation signals are adjusted in response to outputs of the first error amplifier 42 and the second error amplifier 44 and thereby increases or decreases the level of a current $i_L$ flowing through the inductor L1 (as shown in FIG. 1) and the duration of selection of each output.

The converter controller 18 also includes a voltage ramp generator 54 having a voltage ramp output terminal 56, wherein the voltage ramp generator 54 is configured to generate a clock-driven voltage ramp signal. A first comparator 58 has a first error input terminal 60 that is coupled to the first error output terminal 48, and a first voltage ramp input terminal 62 that is coupled to the voltage ramp output terminal 56. The first comparator 58 also has a first duty cycle output terminal 64, wherein the first comparator 58 is configured to generate a first duty cycle signal at the first duty cycle output terminal 64 in response to the first error signal at the first error output terminal 48 and the voltage ramp signal at the first voltage ramp input terminal 62.

A second comparator 66 has a first error input terminal 70 that is coupled to the second error output terminal 52 and a second voltage ramp input terminal 68 that is coupled to the voltage ramp output terminal 56. The second comparator 66 also has a second duty cycle output terminal 72, wherein the second comparator 66 is configured to generate a second duty cycle signal at the second duty cycle output terminal 72 in response to the second error signal at the second error output terminal 52 and the voltage ramp signal at the second voltage ramp input terminal 68.

Digital circuitry 74 has a first duty cycle input terminal 76 coupled to the first duty cycle output terminal 64 and a second duty cycle input terminal 78 coupled to the second duty cycle output terminal 72. The digital circuitry 74 has a clock input 80 that is configured to receive a clock signal that is associated with the voltage ramp generator 54. The clock signal synchronizes the voltage ramp signal with the duty cycle signals generated by the first comparator 58 and the second comparator 66. The digital circuitry 74 is configured to generate the switching control signals at the plurality of switch control output terminals 20 in response to the duty cycle signals generated by the first comparator 58 and the second comparator 66. The digital circuitry 74 may be combinational logic circuits and/or sequential logic circuits or a microprocessor as known to those skilled in the art.

Figure 3:
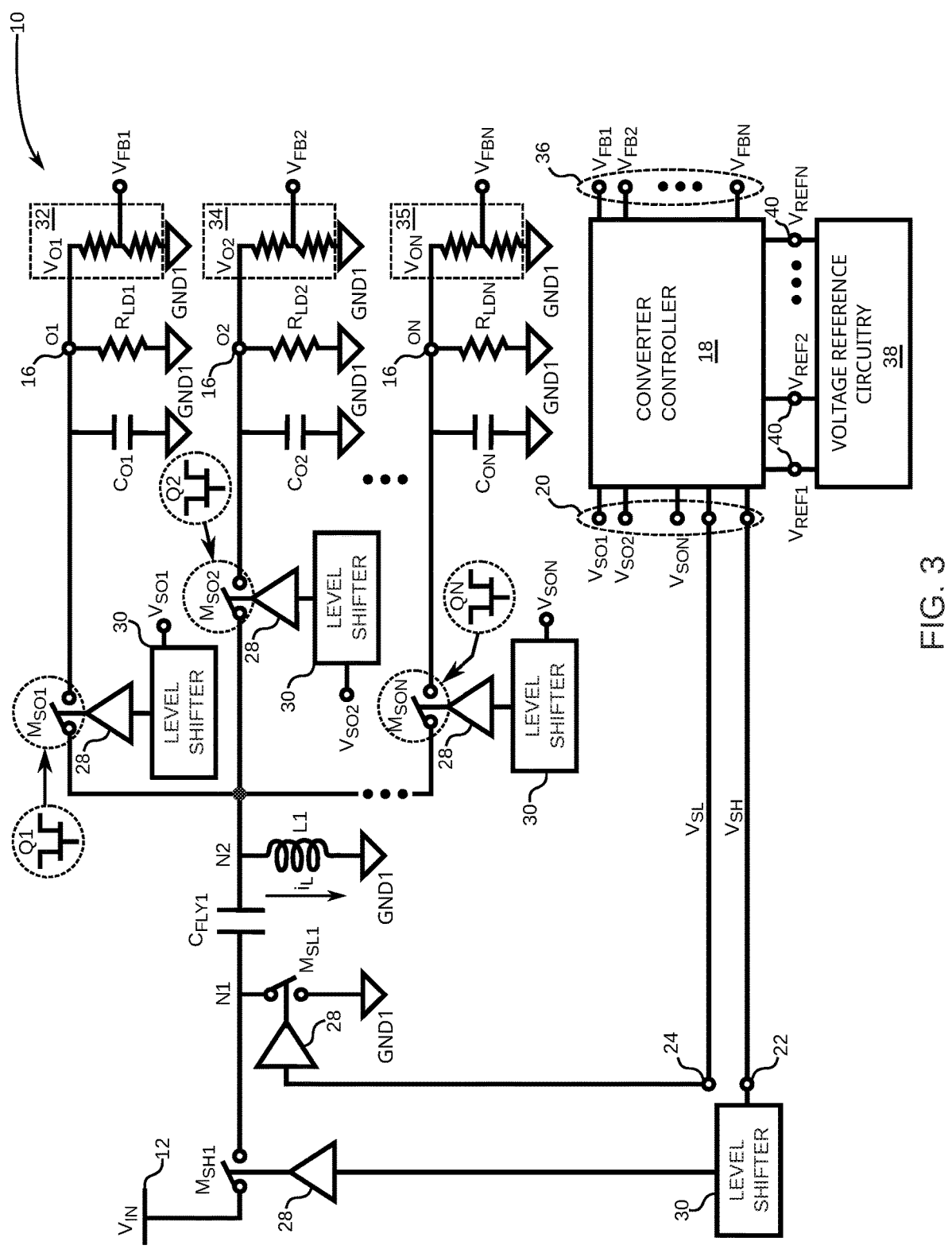
FIG. 3 is a diagram depicting an exemplary embodiment of a power converter having an expanded number of outputs in further accordance with the present disclosure.

FIG. 3 is a diagram depicting an exemplary embodiment of a power converter 10 having an expanded number of outputs in further accordance with the present disclosure. In this exemplary embodiment, an Nth one of the plurality of output switches 14 labeled $M_{SON}$ is coupled between the switching multiple output node N2 and a Nth one of the plurality of output terminals 16 that is labeled ON, wherein N is a natural counting number. An Nth output capacitor $C_{ON}$ is coupled between the Nth one of the plurality of output terminals 16 that is labeled ON and the fixed voltage node GND1. An Nth load resistor $R_{LDN}$ is coupled in parallel with the Nth output capacitor $C_{ON}$. An Nth output voltage VON is divided by an Nth resistor ladder 35 with a ratio to provide the converter controller 18 with an Nth feedback voltage $V_{FBN}$, wherein N is a natural counting number. The voltage reference circuitry 38 is configured to generate an Nth reference voltage $V_{REFN}$ that is received by the converter controller 18 that is further configured to compare the Nth feedback voltage $V_{FBN}$ with the Nth reference voltage $V_{REFN}$ and in response generate an Nth switching control signal $V_{SON}$ that controls the switching of the Nth one of the plurality of output switches 14 labeled $M_{SON}$. Note that as shown in FIG. 3, in exemplary embodiments, the output switches $M_{SO1}$, $M_{SO2}$, and $M_{SON}$ are typically transistor switches such as field-effect transistors (FETs) Q1, Q2, and QN. The input switch $M_{SH1}$ and the discharge switch $M_{SL1}$ may also be transistors and are typically also FETs.

Figure 4:
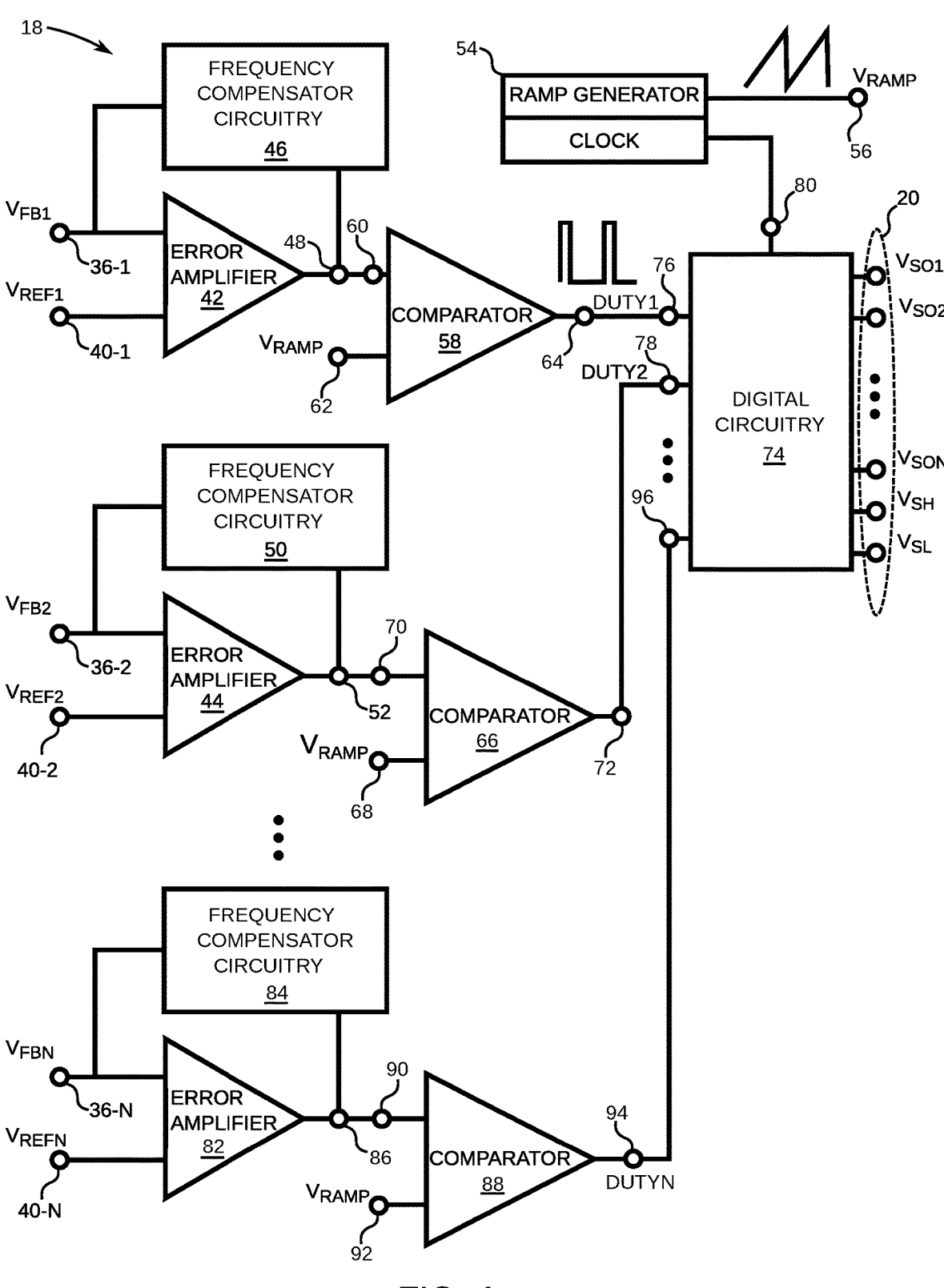
FIG. 4 is a diagram of a converter controller included in the power converter depicted in FIG. 3.

FIG. 4 is a diagram of the converter controller 18 included in the power converter 10 depicted in FIG. 3. In this embodiment, the converter controller 18 includes an Nth error amplifier 82 that is configured to receive the Nth feedback voltage $V_{FBN}$ by way of an Nth feedback input terminal 36-N. The Nth error amplifier 82 is further configured to receive the Nth reference voltage $V_{REFN}$ by way of an Nth reference input terminal 40-N. An Nth frequency compensator circuitry 84 is coupled across the Nth error amplifier 82 between the first feedback input terminal 36-N and an Nth error output terminal 86 to ensure system stability. In some embodiments, the Nth frequency compensator circuitry 84 is a resistor-capacitor filter.

An Nth comparator 88 has an Nth error input terminal 90 that is coupled to the Nth error output terminal 86 and an Nth voltage ramp input terminal 92 that is coupled to the voltage ramp output terminal 56. The Nth comparator 88 also has an Nth duty cycle output terminal 94 that is coupled to an Nth duty cycle input 96 of the digital circuitry 74. The Nth comparator 88 is configured to generate an Nth duty cycle signal DUTYN at the Nth duty cycle output terminal 94 in response to the Nth error signal at the Nth error output terminal 86 and the voltage ramp signal at the Nth voltage ramp input terminal 92.

Figure 5:
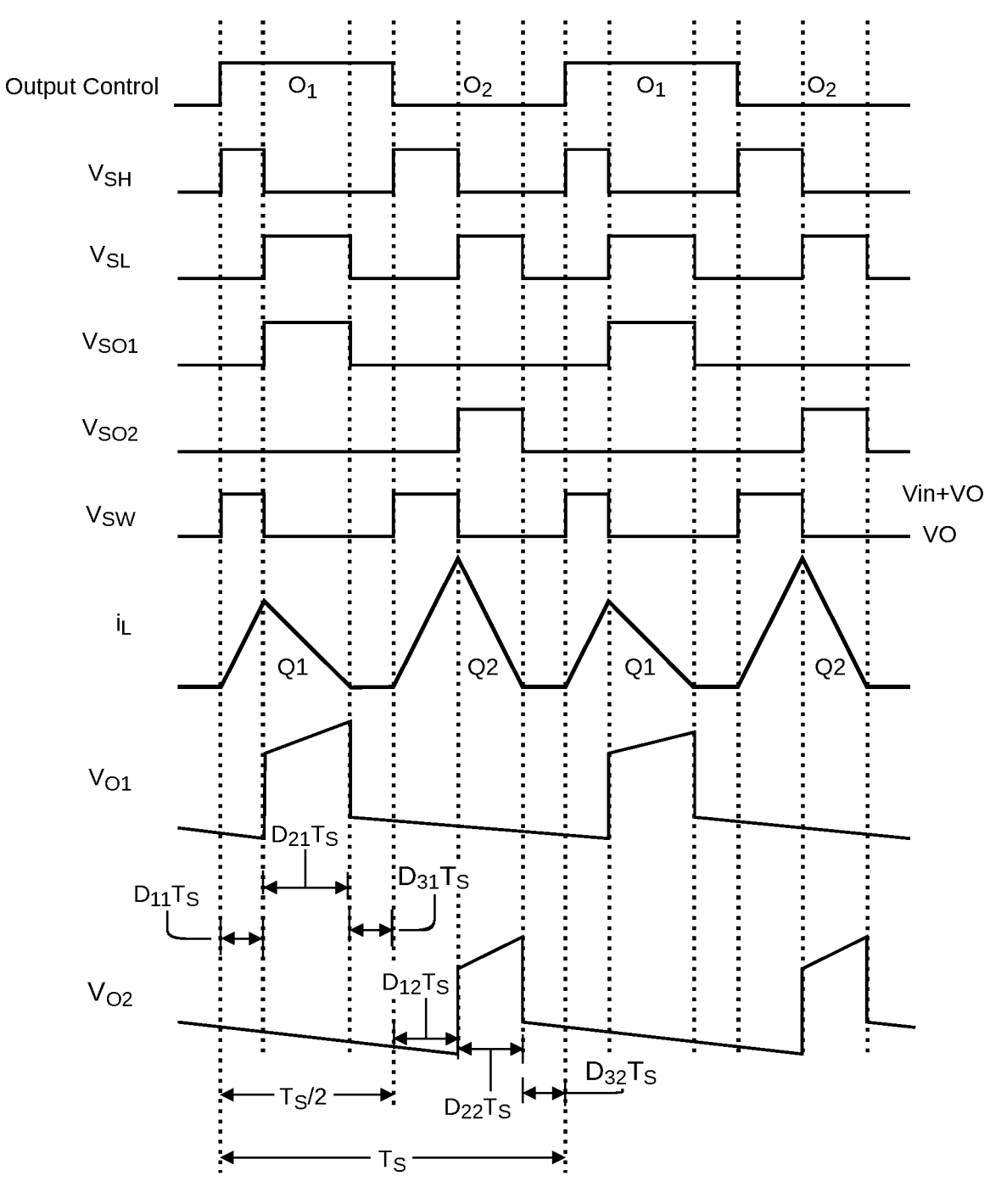
FIG. 5 is a timing diagram of control signals and resultant signals under time multiplexing control for the power converter and converter controller depicted in FIG. 1 and FIG. 2, respectively.

FIG. 5 is a timing diagram depicting time multiplexing (TM) control, the inductor L1 is charged with the current $i_L$ to generate a first output voltage $V_{O1}$ by passing the current $i_L$ to a first output O1. Next, the inductor L1 is charged with the current $i_L$ to generate a second output voltage $V_{O2}$ by passing the current to a second output O2. The inductor L1 is shared with time-multiplexing. An output capacitor will be charged when the inductor L1 is delivering current to it and will be discharged when it is not selected while supporting the load.

With TM control, the power converter 10 normally operates at a discontinuous conduction mode (DCM) in which the inductor current $i_L$ is reset to substantially zero after each charging cycle. In some embodiments, the power converter 10 is configured with an inductor current baseline to a direct current free-wheeling current to increase the current capacity.

Figure 6:
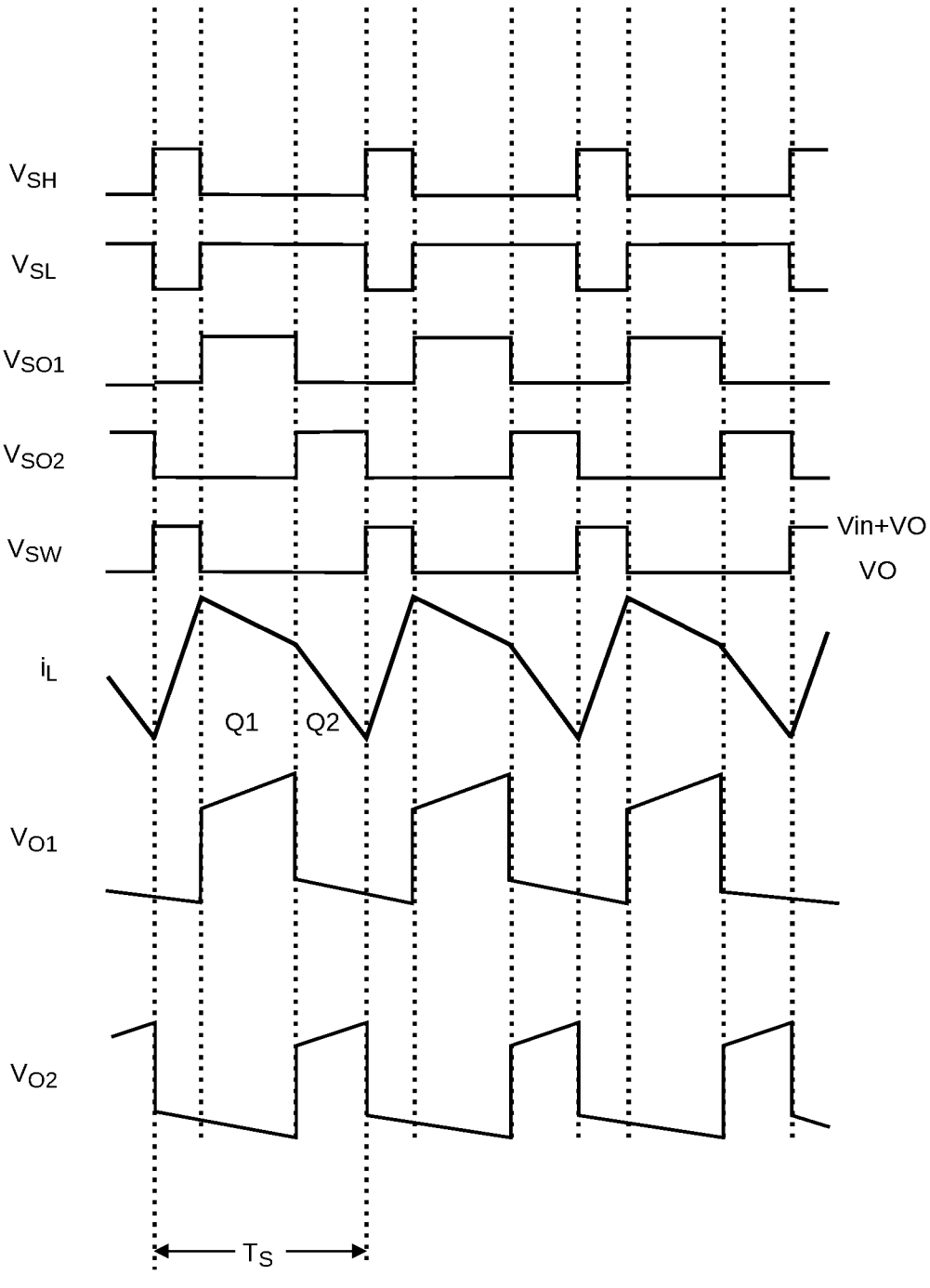
FIG. 6 is a timing diagram of control signals and resultant signals under ordered power distributive control for the power converter and converter controller depicted in FIG. 1 and FIG. 2, respectively.

FIG. 6 is a timing diagram depicting ordered power distributive (OPD) control for the exemplary embodiment of FIG. 1 in which the inductor L1 is charged with current $i_L$ with an amperage that provides enough energy for both outputs O1 and O2 and then delivers the current to the outputs in order, first for the first output voltage $V_{O1}$ and then for the second output voltage $V_{O2}$. The output capacitors $C_{O1}$ and $C_{O2}$ will be alternately charged when the inductor L1 is delivering current to the first and second output capacitors $C_{O1}$ and $C_{O2}$ and will be discharged when selected while providing power to their respective loads.

With OPD control, the power converter 10 normally operates in a continuous conduction mode (CCM) wherein the inductor current $i_L$ is usually above zero with a relatively larger current capacity. In other words, the power converter 10 is configured to operate in the CCM wherein the inductor current is mostly above zero while providing a larger current capacity to one or more loads, such as the load resistors $R_{LD1}$ though $R_{LDN}$. The power converter 10 is configured to go into the DCM in which the current substantially reaches zero and is flat for a controlled period at relatively light load conditions.

Figure 7:
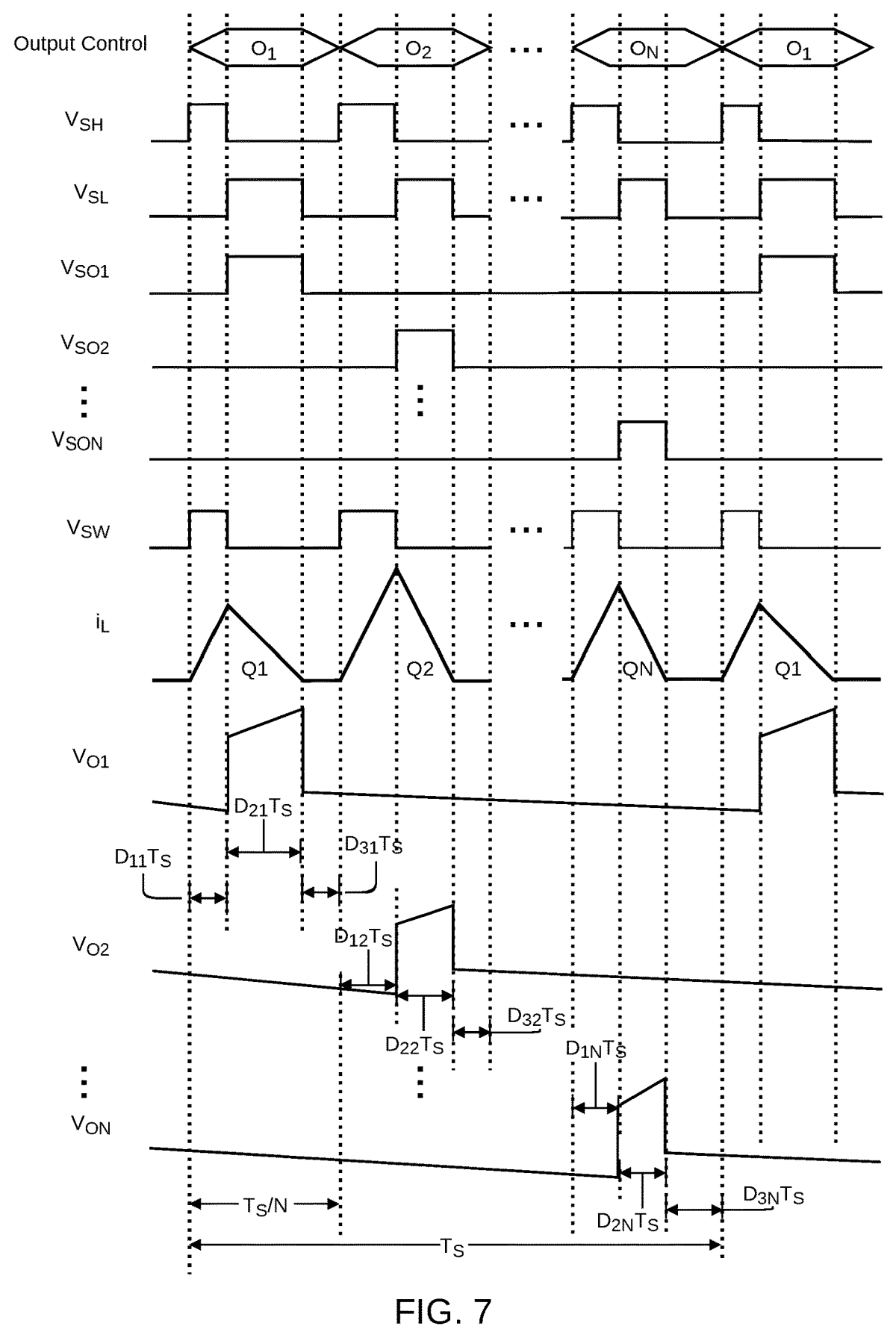

FIG. 7 is a timing diagram of control signals and resultant signals under time multiplexing control for the power converter and converter controller depicted in FIG. 3 and FIG. 4, respectively.

Figure 8:
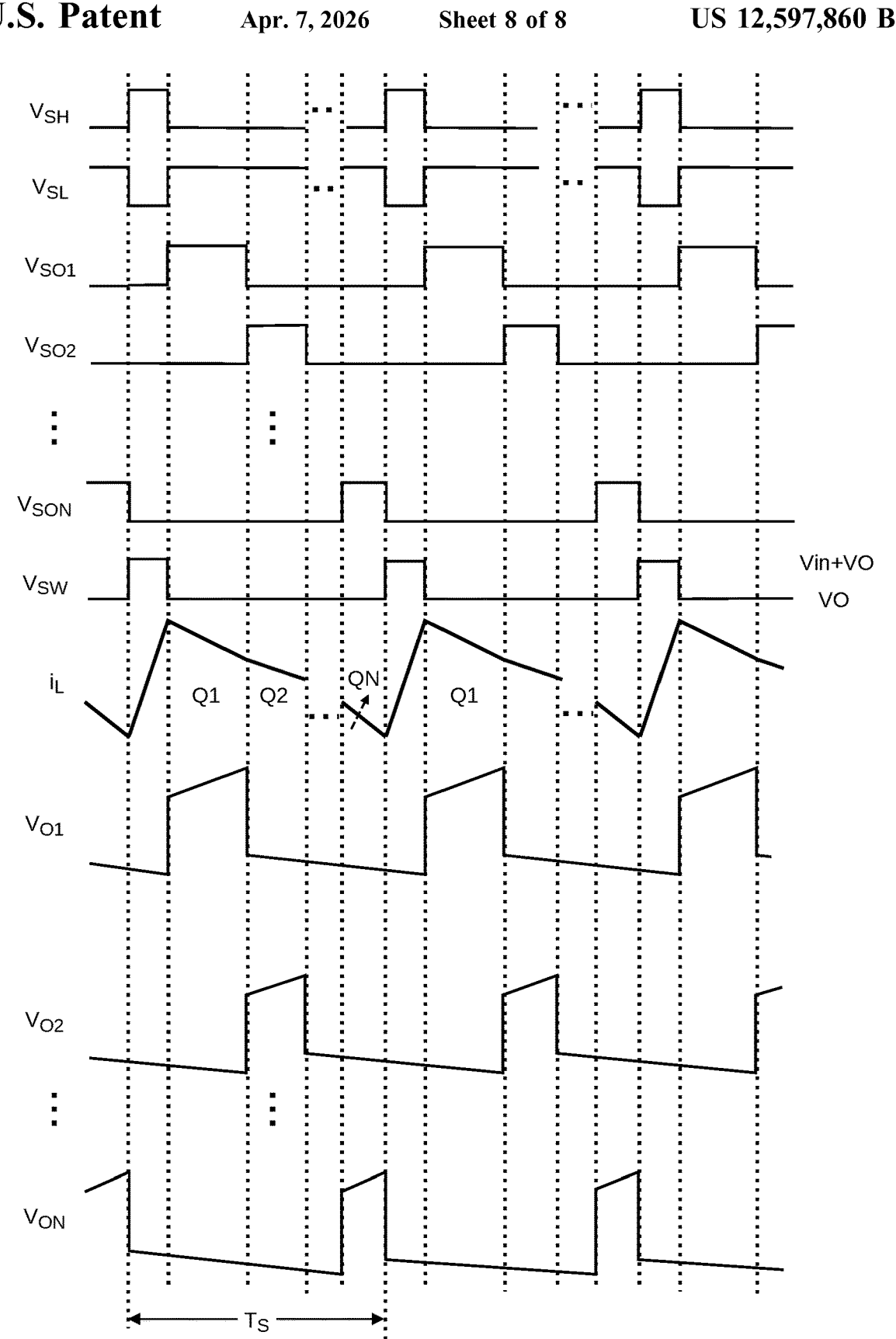
FIG. 8 is a timing diagram of control signals and resultant signals under ordered power distributive control for the power converter and converter controller depicted in FIG. 3 and FIG. 4, respectively.

FIG. 8 is a timing diagram of control signals and resultant signals under ordered power distributive control for the power converter and converter controller depicted in FIG. 3 and FIG. 4, respectively.

In FIG. 1 through FIG. 4 only core circuitry of the power converter 10 is depicted. Other circuitry such as overvoltage/overcurrent protection circuits, under-voltage lock-out circuits, and deadtime generation are not depicted but may be integrated with the power converter without altering the scope of the present disclosure.

The power converter 10 can convert a positive direct current voltage such as 3.3V to multiple negative voltages such as −1V and −2V with voltage regulation employing the single inductor L1 that is coupled between the switching multiple output node N2 and the fixed voltage node GND1. Moreover, the converter controller 18 depicted in FIG. 2 and FIG. 4 is typically configured to provide linear control using voltage-mode control for the regulation of switching multiple output voltages. However, the converter controller 18 may be configured with other control modes that include but are not limited to non-linear control and current-mode control. Also, in exemplary embodiments, the power converter 10 is of the single inductor buck converter type, wherein the inductor L1 is a power inductor and the fixed voltage node is ground to which the inductor L1 is directly grounded.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A power converter comprising:
an input switch coupled between a supply terminal and a switching input node;
a capacitor coupled between the switching input node and a switching multiple output node;

a discharge switch coupled between the switching input node and a fixed voltage node;
an inductor coupled to the input switch through the capacitor and coupled between the switching multiple output node and the fixed voltage node;
a plurality of output switches coupled between the switching multiple output node and a corresponding one of a plurality of output terminals; and
a converter controller having a plurality of switch control outputs coupled to corresponding ones of an input switching control terminal, a discharge switching control terminal, and an output switching control terminal of each of the plurality of output switches, wherein the converter controller is configured to generate switching signals for the input switch, the discharge switch, and the plurality of output switches to generate individual output voltages at corresponding ones of the plurality of output terminals.

2. The power converter of claim 1 wherein the converter controller further comprises a plurality of reference voltage terminals configured to receive a corresponding plurality of reference voltage levels that represent corresponding ones of the individual output voltages at each of the plurality of output terminals.

3. The power converter of claim 2 wherein the converter controller further comprises a plurality of feedback input terminals coupled to the plurality of output terminals, wherein the converter controller is further configured to receive at the feedback input terminals a plurality of feedback signals representing voltage levels of output voltages at the plurality of output terminals and compare the plurality of feedback signals with reference voltage levels and in response adjust timing of the switching signals controlling the input switch, the discharge switch, and the plurality of output switches to maintain individual output voltages at the corresponding ones of the plurality of output terminals.

4. The power converter of claim 3 further comprising a plurality of resistor ladders that are configured to each divide a corresponding one of the individual output voltages at corresponding ones of the plurality of output terminals by a ratio to provide the converter controller the plurality of feedback signals.

5. The power converter of claim 1 wherein the converter controller is configured to generate pulse width modulation signals at the plurality of switch control outputs, wherein the pulse width modulation signals control the switching of the input switch, the discharge switch, and the plurality of output switches to generate the individual output voltages at corresponding ones of the plurality of output terminals.

6. The power converter of claim 5 wherein the converter controller comprises:
a plurality of error amplifiers, each having a feedback input coupled to a corresponding one of the plurality of output terminals and a reference voltage input coupled to a corresponding one of a plurality of reference voltage terminals that are configured to receive a corresponding plurality of reference voltage levels that each represent corresponding individual output voltages at each of the plurality of output terminals, and an error output terminal;
a voltage ramp generator having a voltage ramp output terminal, wherein the voltage ramp generator is configured to generate a clock-driven voltage ramp signal;
a plurality of comparators each having an error input terminal coupled to the error output terminal of a corresponding one of the plurality of error amplifiers, a voltage ramp input terminal coupled to the voltage ramp output terminal, and a duty cycle output terminal, wherein each of the plurality of comparators is configured to generate a duty cycle signal at its duty cycle output terminal in response to an error signal at its error output terminal and the voltage ramp signal at its voltage ramp input terminal; and digital circuitry having a plurality of duty cycle input terminals coupled to the duty cycle output terminal of corresponding ones of the plurality of comparators, wherein the digital circuitry is configured to generate switching control signals in response to the duty cycle signal generated by each of the plurality of comparators.

7. The power converter of claim 1 wherein the converter controller is configured to convert a positive voltage at the switching input node to a plurality of negative voltages wherein there is one of the plurality of negative voltages for each of a corresponding one of the plurality of output terminals.

8. The power converter of claim 1 wherein the converter controller is configured to provide linear control using voltage-mode control for the regulation of the individual output voltages.

9. The power converter of claim 1 is of a single inductor inverting buck type.

10. The power converter of claim 9 wherein the inductor is a power inductor, and the fixed voltage node is ground.

11. The power converter of claim 1 further comprising a plurality of output capacitors each coupled between corresponding ones of the output terminals and the fixed voltage node.

12. The power converter of claim 1 wherein the input switch, the discharge switch, and the plurality of output switches are transistor switches.

13. The power converter of claim 12 wherein the transistors are field-effect transistors.

14. The power converter of claim 13 further comprising drivers configured to drive switching at least some of the transistors.

15. The power converter of claim 1 wherein a total number of switches is no more than the plurality of output switches plus the input switch and the discharge switch.

16. The power converter of claim 1 is configured with an inductor current baseline current that is a non-zero current to increase current capacity.

17. The power converter of claim 1 is configured to operate at a discontinuous conduction mode (DCM) in which an inductor current is reset to substantially zero after each charging cycle.

18. The power converter of claim 1 is configured to operate in a continuous conduction mode (CCM) wherein an inductor current flowing through the inductor is mostly above zero while providing a larger current capacity to one or more loads.

19. The power converter of claim 1 is configured to provide ordered power distributive control to generate the individual output voltages at corresponding ones of the plurality of output terminals.

20. The power converter of claim 1 is configured to operate in the DCM in which an inductor current is reset to substantially zero after each charging cycle and is further configured to operate in the continuous conduction mode CCM wherein the inductor current is mostly above zero while providing a larger current capacity to one or more loads.

* * * * *